(12) United States Patent
Jörn et al.

(10) Patent No.: US 10,259,557 B2
(45) Date of Patent: Apr. 16, 2019

(54) PRESSURE BULKHEAD FOR AN AIRCRAFT FUSELAGE, AND AN AIRCRAFT COMPRISING SUCH A PRESSURE BULKHEAD

(71) Applicant: Airbus Operations GmbH, Hamburg (DE)

(72) Inventors: Paul Jörn, Hamburg (DE); Markus Müller, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 96 days.

(21) Appl. No.: 15/159,010

(22) Filed: May 19, 2016

(65) Prior Publication Data

US 2016/0340018 A1 Nov. 24, 2016

(30) Foreign Application Priority Data

May 20, 2015 (EP) .................................... 15168516

(51) Int. Cl.
*B64C 1/10* (2006.01)
*B32B 3/12* (2006.01)
*B32B 5/18* (2006.01)

(52) U.S. Cl.
CPC .................. *B64C 1/10* (2013.01); *B32B 3/12* (2013.01); *B32B 5/18* (2013.01); *B32B 2605/18* (2013.01)

(58) Field of Classification Search
CPC ........... B32B 5/18; B32B 3/12; B32B 27/065; B32B 2305/022; B32B 2307/102;
(Continued)

(56) References Cited

U.S. PATENT DOCUMENTS 2,813,692 A * 11/1957 Peterson ............... H01B 17/306
174/152 R
4,296,869 A * 10/1981 Jawad ..................... B65D 88/04
220/586
(Continued)

FOREIGN PATENT DOCUMENTS

CN 101801783 A 8/2010
CN 106167085 B 10/2018
(Continued)

OTHER PUBLICATIONS

Extended European Search Report for Application No. EP 15 16 8518.7 dated Oct. 21, 2015.
(Continued)

*Primary Examiner* — Assres H Woldemaryam
(74) *Attorney, Agent, or Firm* — Jenkins, Wilson, Taylor & Hunt, P.A.

(57) ABSTRACT

Described and illustrated is a pressure bulkhead for an aircraft fuselage, comprising a sandwich structure defining a central axis and extending between a circumferential border area which is configured for being mounted to a fuselage shell, wherein the sandwich structure comprises an inner face sheet extending perpendicularly with respect to the central axis, an outer face sheet opposite the inner face sheet, extending perpendicularly with respect to the central axis, and a core assembly sandwiched between the inner face sheet and the outer face sheet, wherein the inner face sheet, when viewed in a radial cross section along the central axis, has an even shape. The object of the present disclosure, to provide a pressure bulkhead for an aircraft fuselage, wherein the required weight is reduced, is achieved in that the outer face sheet, when viewed in the radial cross section along the central axis, has a convex shape, wherein the distance between the outer face sheet and the inner face sheet
(Continued)

increases tangent continuously from the border area to the central axis.

15 Claims, 2 Drawing Sheets

(58) Field of Classification Search
CPC ............ B32B 2250/03; B32B 2250/40; B32B 2605/12; B64C 1/12; B64C 1/10; B64C 1/40; B64C 2001/0072; B64C 1/061; B64C 1/068
See application file for complete search history.

(56) References Cited

U.S. PATENT DOCUMENTS

| | | | | |
|---|---|---|---|---|
| 5,062,589 | A * | 11/1991 | Roth .................... | B64C 1/10 244/117 R |
| 6,213,426 | B1 * | 4/2001 | Weber .................. | B64C 1/10 244/117 R |
| 6,378,805 | B1 * | 4/2002 | Stephan ............... | B64C 1/10 244/117 R |
| 7,766,277 | B2 * | 8/2010 | Anderson ............. | B64C 1/10 244/121 |
| 8,181,421 | B2 * | 5/2012 | Shaw ................... | B29C 63/04 244/119 |
| 8,444,089 | B2 | 5/2013 | Mischereit et al. | |
| 8,985,512 | B1 | 3/2015 | Chan et al. | |
| 2008/0063875 | A1 * | 3/2008 | Robinson ............. | B32B 1/08 428/426 |
| 2008/0179459 | A1 * | 7/2008 | Garcia Laja ......... | B64C 1/10 244/119 |
| 2010/0155533 | A1 | 6/2010 | McKinnie et al. | |
| 2010/0155537 | A1 | 6/2010 | Barland et al. | |
| 2010/0243806 | A1 * | 9/2010 | Vera Villares ....... | B64C 1/10 244/119 |
| 2010/0258673 | A1 * | 10/2010 | Garcia Laja ......... | B64C 1/10 244/121 |
| 2014/0042271 | A1 | 2/2014 | Paci et al. | |
| 2014/0054419 | A1 * | 2/2014 | Grase .................. | B64C 1/10 244/121 |
| 2015/0008285 | A1 * | 1/2015 | Zuardy ................ | B64C 1/10 244/119 |
| 2016/0297510 | A1 * | 10/2016 | Folch Cortes ....... | B64C 1/10 |
| 2016/0340017 | A1 | 11/2016 | Jörn et al. | |
| 2017/0137107 | A1 * | 5/2017 | Zuardy ................ | B64C 1/10 |

FOREIGN PATENT DOCUMENTS

| | | |
|---|---|---|
| DE | 10 2007 044 388 B4 | 8/2012 |
| DE | 10 2012 005 451 A1 | 9/2013 |
| EP | 3095689 B1 | 10/2017 |

OTHER PUBLICATIONS

European Search Report for Application No. EP 15 16 8516.1 dated Nov. 2, 2015.
Chinese Office Action for Application No. 201610338925.6 dated Nov. 16, 2017.
Chinese Office Action for Application No. 201610341958.6 dated Nov. 16, 2017.
Second Chinese Office Action for Chinese Application No. 201610341958.6 dated Jul. 20, 2018.
Restriction Requirement for U.S. Appl. No. 15/158,994 dated Aug. 2, 2018.
Non-Final Office Action for U.S. Appl. No. 15/158,994 dated Nov. 1, 2018.

* cited by examiner

PRESSURE BULKHEAD FOR AN AIRCRAFT FUSELAGE, AND AN AIRCRAFT COMPRISING SUCH A PRESSURE BULKHEAD

CROSS-REFERENCE TO RELATED APPLICATION

This application claims priority to European Patent Application No. 15168516.1 filed May 20, 2015, the entire disclosure of which is incorporated by reference herein.

TECHNICAL FIELD

The present disclosure relates to a pressure bulkhead for an aircraft fuselage, as well as to an aircraft comprising such a pressure bulkhead.

BACKGROUND

The pressure bulkhead comprises a sandwich structure which defines a central axis and which extends between, i.e. is surrounded by, a circumferential border area which is configured for being mounted to a fuselage shell of an associated aircraft fuselage. The central axis preferably extends in parallel with respect to a longitudinal axis of an associated aircraft fuselage, or approximately in parallel with respect to the longitudinal axis.

The sandwich structure comprises an inner face sheet, an outer face sheet opposite the inner face sheet, and a core assembly which is sandwiched between the inner and outer face sheets. Both, the inner face sheet and the outer face sheet extend transverse, preferably perpendicular, with respect to the central axis. Preferably, the pressure bulkhead is installed or can be installed in an associated aircraft fuselage in such a manner that the inner face sheet faces the cabin and the outer face sheet faces away from the cabin. The core assembly connects the inner face sheet to the outer face sheet. Further, the inner face sheet, when viewed in a radial cross section along the central axis, has an even or straight shape. The radial cross section is considered a cross section along the central axis, i.e. in parallel with the central axis and not transverse to the central axis.

Similar pressure bulkheads are known from the prior art. DE 10 2012 005 451 A1 discloses a pressure bulkhead for an aircraft fuselage, comprising a sandwich structure including an inner face sheet, an outer face sheet and a foam core sandwiched between the face sheets. The sandwich structure has a lenticular cross section, wherein the thickness increases continuously from a border area to a central axis. However, the lenticular surface of the inner face sheet complicates the integration of cabin arrangements to the pressure bulkhead, and the ratio of strength to weight of the lenticular sandwich structure is not at an optimum.

DE 10 2007 044 388 B4 discloses a pressure bulkhead for an aircraft fuselage formed as a sandwich structure having an inner face sheet, an outer face sheet, and a core sandwiched between the face sheets. The inner face sheet has an even cross section while the outer face sheet has a cross section which is flexed so that the distance between the outer face sheet and the inner face sheet gradually increases from the border area to a central axis. In the border area, where the sandwich structure is mounted to a fuselage shell, the distance between the outer and inner face sheets is constant up to a kink in the outer face sheet, from where on the outer face sheet extends away from the inner face sheet so that their distance increases linearly, when viewed from the border area to the central line. This linear increase runs until a second kink in the outer face sheet, from where on the outer and inner face sheets are in parallel again having a constant distance to one another, when viewed from the border area to the central line.

By such an even inner face sheet the integration and connection of cabin arrangements to the pressure bulkhead is facilitated. However, such a gradually increasing cross section including several kinks and straight sections in the outer face sheet does not provide an optimum continuous stress distribution and, as a result, involves more than an optimum weight.

SUMMARY

Therefore, an object of the present disclosure is to provide a pressure bulkhead for an aircraft fuselage, wherein the required weight is reduced.

This object is achieved in that the outer face sheet, when viewed in the radial cross section along the central axis, has a convex shape, wherein the distance between the outer face sheet and the inner face sheet increases tangent continuously from the border area to a central area about the central axis, preferably to the central axis.

The central area is considered an area about the central axis, i.e. through which the central axis extends. The distance between the outer and inner face sheets at the central area might be constant, and a breakthrough or additional equipment might be provided in the central area. The extension of the central area perpendicular to the central axis might be small compared to the distance between the border area and the central axis, and might preferably be zero so that the distance between the outer face sheet and the inner face sheet increases tangent continuously from the border area to the central axis, directly. The radial cross section referred to here might be only one particular radial cross section along the central axis at a particular location, but may also be the radial cross section of the pressure bulkhead along the central axis at different locations.

In such a manner, an optimum strength to weight ration of the sandwich structure can be reached due to the convex, tangent continuous cross section of the outer face sheet, while at the same time, due to its even cross section, the inner face sheet forms an optimum cabin interface so that easy integration of cabin arrangement to the pressure bulkhead is possible.

According to a preferred embodiment the outer face sheet, when viewed in the radial cross section along the central axis, has a shape of a catenary curve. The catenary curve can be defined as:

$$y = a \cdot \cosh\left(\frac{x - x_0}{a}\right) + y_0;$$

wherein the x-axis extends in a radial direction perpendicularly with respect to the central axis, wherein the y-axis extends perpendicularly with respect to the x-axis and, thus, perpendicularly with respect to the central axis, wherein a represents an amplification factor, wherein $x_0$ represents the distance of the apex from the central axis, and wherein $y_0$ represents the displacement along the central axis. By such a catenary curved cross section of the outer face sheet bending moments caused by the pressure difference on both sides of the pressure bulkhead can be transferred in a very effective way, thereby requiring a minimum weight of the pressure bulkhead.

According to an alternative preferred embodiment, the outer face sheet, when viewed in the radial cross section along the central axis, has a shape of a parabola. By such a parabolic cross section of the outer face sheet bending moments and loads caused by the pressure difference between both sides of the pressure bulkhead can be transferred in a very effective manner, thereby involving only a minimum weight of the pressure bulkhead.

According to a further alternative preferred embodiment, the outer face sheet, when viewed in the radial cross section along the central axis, has a shape of a segment of a circle. By such a circular cross section of the outer face sheet bending moments and loads caused by the pressure difference between both sides of the pressure bulkhead can be transferred in a very effective way, thereby requiring only a minimum weight of the pressure bulkhead.

In another preferred embodiment, a neutral axis of the sandwich structure, when viewed in the radial cross section along the central axis, deviates from a straight line at a maximum deviation point by a distance of 0-50%, preferably 10-40%, further preferred 20-30%, most preferred 25% of the total thickness of the sandwich structure measured at the maximum deviation point, preferably along the central axis. The straight line referred to in this context is preferably a line which straightly connects the two opposite roots of the neutral axis at the border area. The maximum deviation point referred to in this context lies preferably on the central axis, but may also lie remote from the central axis, e.g, where the maximum distance between the inner face sheet and the outer face sheet is not at the central axis but remote from the central axis. By such a deviation of the neutral axis from a straight line, which can in general be adjusted by adjusting the shape of the outer face sheet and the core assembly, an advantageous distribution of bending moments and loads in the pressure bulkhead can be reached, which in turn leads to a further reduction of weight of the pressure bulkhead.

In a further preferred embodiment, a monolithic reinforcement area is provided at the border area, where the inner and outer face sheets are formed integrally and no core assembly is provided. Monolithic in this connection means that no core assembly is provided in this area but the inner and outer face sheets are integrated into one common structure. By such a reinforcement area the border area, which has to transfer the highest loads and bending moments, is particularly reinforced by deviating from a sandwich structure with a core in this area.

According to an alternative preferred embodiment, the core assembly, and preferably also the face sheets, extends through the border area. That means the border area is formed as a sandwich structure and is preferably formed integrally with, i.e. as a part of, the remaining sandwich structure between opposite sides of the border area. In such a way, the pressure bulkhead can be produced in a very simple manner and with a minimum weight.

In another preferred embodiment, a monolithic reinforcement area is provided at the central area around the central axis, where the inner and outer face sheets are formed integrally and no core assembly is provided. Monolithic in this connection means that no core assembly is provided in this area but the inner and outer face sheets are integrated into one common structure. By such a reinforcement area the central area around the central axis, which has to transfer high loads and bending moments, and which might also be weakened due to a possible breakthrough for passing equipment from one side of the pressure bulkhead to the other, can be particularly reinforced by deviating from the sandwich structure in this particular area.

According to a further preferred embodiment, a breakthrough is provided in the sandwich structure for passing equipment from one side of the pressure bulkhead to the other. By the term "equipment" in this connection it is referred to e.g. cables, pipes, or other conductors, as well as to any possible mechanic elements. In such a way, energy or information can be transferred through the pressure bulkhead inside or outside of the pressurized cabin. For example, electric energy generated by the auxiliary power unit (APU), which is arranged behind the pressure bulkhead in the tail area, can be transferred inside the cabin.

In particular, it is preferred that the breakthrough is provided in the central area around the central axis. In the central area the breakthrough weakens the pressure bulkhead the least because of its symmetric position.

According to yet a further preferred embodiment, the inner face sheet and/or the outer face sheet comprises a metal material or a composite material. The metal material can preferably be an aluminum material, including aluminum alloys. The composite material can preferably be a carbon fiber reinforced plastic (CFRP) material, a glass fiber reinforced plastic (GFRP) material, or an aluminum-glass fiber-aluminum composite (GLARE®) material. Such materials can transfer considerably high bending moments and loads, while having considerably low weight.

According to yet a further preferred embodiment, the core assembly comprises a honeycomb core, a folded core, a foam core, or a built core including profile carriers such as I or Omega profiles. Additionally, the core assembly might be reinforced by pins. Such core assemblies can transfer considerably high shear forces, while having considerably low weight. The material of the core assembly is preferably chosen from metal, wood, aramide paper, CFRP, GFRP, or Polymethacrylimide (PMI) foam.

In a preferred embodiment, the sandwich structure, when viewed in an axial cross section perpendicular to the central axis, has a shape of a circle. In another preferred embodiment, the sandwich structure, when viewed in an axial cross section perpendicular to the central axis, has a shape which deviates from a circle. This shape may be any arbitrary but preferably curved shape, such as an ellipse. In particular, the sandwich structure defines a semiminor axis which is defined as the shortest distance between the border area and the central axis. Further particular, the sandwich structure defines a semimajor axis which is defined as the longest distance between the border area and the central axis. Preferably, the distance between the outer face sheet and the inner face sheet, when measured at a center of the semiminor axis, is between 25% and 100%, preferably between 50% and 75%, further preferred at approximately 60% of the distance between the outer face sheet and the inner face sheet, when measured at a center of the semimajor axis. Preferably, the center of the semiminor axis is considered the midway, i.e. half the distance, between the border area and the central axis along the semiminor axis, and the center of the semimajor axis is considered the midway, i.e. half the distance, between the border area and the central axis along the semimajor axis. With such distances between the outer and inner face sheets the thickness of non-circular pressure bulkheads can be adjusted in order to obtain an optimum lead distribution and, thus, allow a minimum weight.

A further aspect of the present disclosure relates to an aircraft comprising an aircraft fuselage and a pressure bulkhead according to any of the before-described embodiments, which is installed in the aircraft fuselage, preferably in the tail area of the aircraft fuselage in order to separate the pressurized cabin from the unpressurized tail section. The features and advantages presented in connection with the pressure bulkhead apply vis-à-vis to the aircraft according to the disclosure herein.

BRIEF DESCRIPTION OF THE DRAWINGS

In the following a preferred embodiment of the present disclosure is described in more detail by a drawing. The drawing shows in FIG. 1 a radial cross sectional view along the central axis of an embodiment of the pressure bulkhead according to the disclosure herein, and FIG. 2 an axial cross sectional view perpendicular to the central axis of the embodiment of FIG. 1.

DETAILED DESCRIPTION

Figure 1:
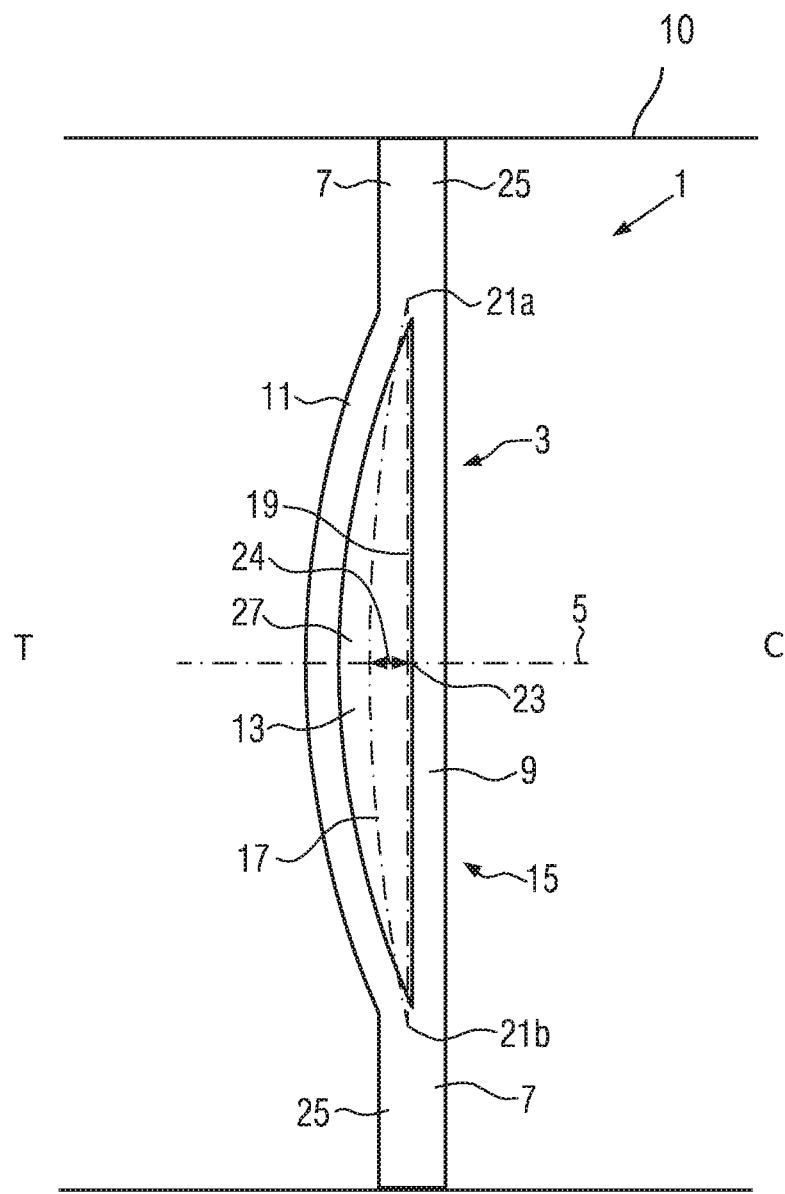

In FIG. 1 a preferred embodiment of a pressure bulkhead 1 for an aircraft fuselage according to the present disclosure is shown. The pressure bulkhead 1 is formed as a sandwich structure 3 which in its center defines a central axis 5, and which extends between a circumferential border area 7. The border area 7 is configured for being mounted to an aircraft fuselage 10 in which the pressure bulkhead 1 is to be installed.

The sandwich structure 3 comprises an inner face sheet 9, an outer face sheet 11 opposite the inner face sheet 9, and a core assembly 13 sandwiched between the inner and outer face sheets 9, 11. Inner and outer face sheets 9, 11 both extend perpendicularly with respect to the central axis 5. The core assembly 13 is connected to the inner face sheet 9 as well as to the outer face sheet 11. When the pressure bulkhead 1 is installed in aircraft fuselage 10 the inner face sheet 9 faces the cabin side C, i.e. the pressure side of aircraft fuselage 10, and the outer face sheet 11 faces away from the cabin to the tail side T of aircraft fuselage 10.

The inner face sheet 9, when viewed in a radial cross section 15 along, i.e. in parallel with, the central axis 5, has an even shape. The outer face sheet 11, when viewed in the radial cross section 15 along the central axis 5, has a convex shape, wherein the distance between the outer face sheet 11 and the inner face sheet 9 increases tangent continuously from the border area 7 to the central axis 5.

In the present embodiment the outer face sheet 11, when viewed in the radial cross section 15 along the central axis 5 has a shape of a catenary curve, but in other embodiments may also have the shape of a parabola or a segment of a circle.

The neutral axis 17 of the sandwich structure 3, when viewed in the radial cross section 15 along the central axis 5, deviates from a straight line 19 which connects the opposite roots 21a, 21b of the neutral axis 17 at the border area 7 in a straight way, when measured at a maximum deviation point 23 at the central axis 5, by a distance 24 of 25% of the total thickness of the sandwich structure 3 measured at the central axis 5.

Further, at the border area 7 a monolithic reinforcement area 25 is provided, where the inner and outer face sheets 9, 11 are formed integrally and no core assembly 13 is provided between the face sheets 9, 11. Alternatively or additionally, a monolithic reinforcement area 25 could be provided at a central area 27 around the central axis 5.

The inner face sheet 9 and the outer face sheet 11 in the present embodiment are formed of a carbon fiber reinforced plastic (CFRP) material, but could also be formed of a glass fiber reinforced plastic (GFRP) material, of an aluminum-glass fiber-aluminum composite (GLARE®) material, or of an aluminum material. The core assembly 13 in the present embodiment is formed as a honeycomb core, but could also be formed as a folded core, a foam core, or a built core including profile carriers.

Figure 2:
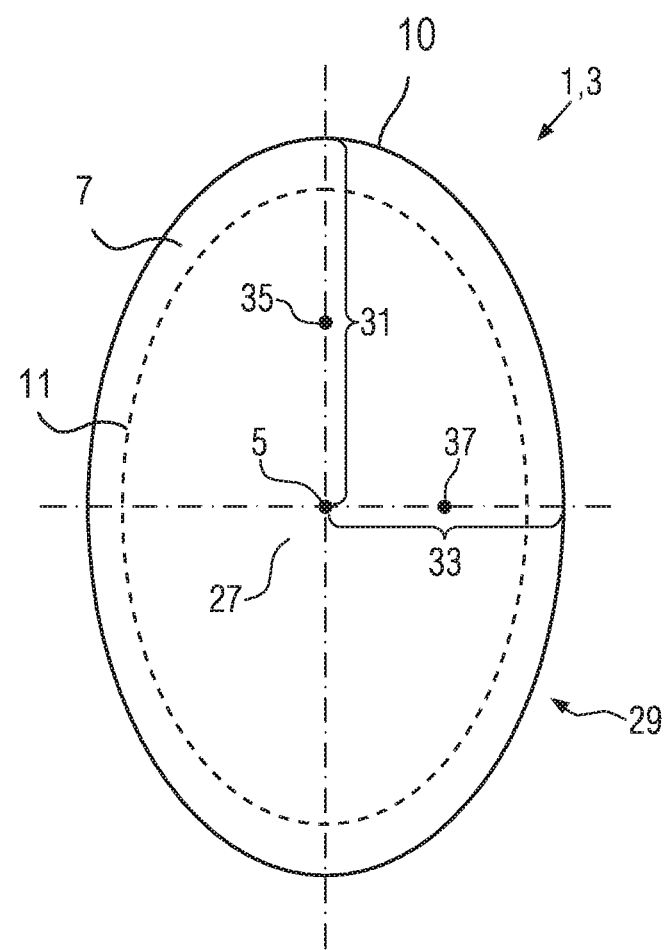

As shown in FIG. 2, the sandwich structure 3, when viewed in an axial cross section 29 perpendicular to the central axis 5, has an elliptic shape. The sandwich structure 3 has a semiminor axis 33 which forms the shortest distance between the border area 7 and the central axis 5. The sandwich structure 3 further has a semimajor axis 31, which forms the longest distance between the border area 7 and the central axis 5. The distance between the outer face sheet 11 and the inner face sheet 9, when measured at a center 37 of the semiminor axis 33, is at approximately 60% of the distance between the outer face sheet 11 and the inner face sheet 9, when measured at a center 35 of the semimajor axis 31.

By such a pressure bulkhead 1 having a straight inner face sheet 9 and a convex outer face sheet 11 cabin arrangements can be easily integrated into the inner face sheet 9 of the pressure bulkhead 1, and the pressure bulkhead 1 can be formed with a minimum weight, since the convex-shaped outer face sheet 11 and, thus, the neutral axis 17 of the pressure bulkhead 1 allow an optimum stress distribution and load transmission.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage pressure bulkhead, comprising:
a sandwich structure defining a central axis and extending between a circumferential border area which is configured for being mounted to a fuselage shell;
the sandwich structure comprising:
an inner face sheet extending transverse to the central axis;
an outer face sheet opposite the inner face sheet, extending transverse to the central axis; and
a core assembly sandwiched between the inner face sheet and the outer face sheet;
wherein the inner face sheet, when viewed in a radial cross section along the central axis, has a planar shape, and
wherein the outer face sheet, when viewed in the radial cross section along the central axis, has a convex shape, wherein the distance between the outer face sheet and the inner face sheet increases tangent-continuously from the border area to a central area about the central axis.

2. The pressure bulkhead according to claim 1, wherein the outer face sheet, when viewed in the radial cross section along the central axis, has a shape of a catenary curve.

3. The pressure bulkhead according to claim 1, wherein the outer face sheet, when viewed in the radial cross section along the central axis, has a shape of a parabola.

4. The pressure bulkhead according to claim 1, wherein the outer face sheet, when viewed in the radial cross section along the central axis, has a shape of a segment of a circle.

5. The pressure bulkhead according to claim 1, wherein a neutral axis of the sandwich structure, when viewed in the radial cross section along the central axis, deviates from a straight line at a maximum deviation point by a distance of 0-50% of the total thickness of the sandwich structure measured at the maximum deviation point.

6. The pressure bulkhead according to claim 1, wherein the core assembly extends through the border area.

7. The pressure bulkhead according to claim 1, wherein the inner face sheet and/or the outer face sheet comprises an aluminum material, a carbon fiber reinforced plastic (CFRP) material, a glass fiber reinforced plastic (GFRP) material, or a GLARE® material.

8. The pressure bulkhead according to claim 1, wherein the core assembly comprises a honeycomb core, a folded core, a foam core, or a built core.

9. The pressure bulkhead according to claim 1, wherein the sandwich structure, when viewed in an axial cross section perpendicular to the central axis, has a shape which deviates from a circle,
wherein the sandwich structure defines a semiminor axis which forms the shortest distance between the border area and the central axis,
wherein the sandwich structure defines a semimajor axis which forms the longest distance between the border area and the central axis, and
wherein the distance between the outer face sheet and the inner face sheet, when measured at a center of the semiminor axis, is between 25% and 100% of the distance between the outer face sheet and the inner face sheet, when measured at a center of the semimajor axis.

10. An aircraft comprising an aircraft fuselage and a pressure bulkhead which is installed in the aircraft fuselage, the pressure bulkhead comprising:
a sandwich structure defining a central axis and extending between a circumferential border area which is configured for being mounted to a fuselage shell;
the sandwich structure comprising:
an inner face sheet extending transverse to the central axis;
an outer face sheet opposite the inner face sheet, extending transverse to the central axis; and
a core assembly sandwiched between the inner face sheet and the outer face sheet;
wherein the inner face sheet, when viewed in a radial cross section along the central axis, has a planar shape, and
wherein the outer face sheet, when viewed in the radial cross section along the central axis, has a convex shape, wherein the distance between the outer face sheet and the inner face sheet increases tangent-continuously from the border area to a central area about the central axis.

11. The pressure bulkhead according to claim 1, wherein a neutral axis of the sandwich structure, when viewed in the radial cross section along the central axis, deviates from a straight line at a maximum deviation point by a distance of 10-40% of the total thickness of the sandwich structure measured at the maximum deviation point.

12. The pressure bulkhead according to claim 1, wherein a neutral axis of the sandwich structure, when viewed in the radial cross section along the central axis, deviates from a straight line at a maximum deviation point by a distance of 20-30% of the total thickness of the sandwich structure measured at the maximum deviation point.

13. The pressure bulkhead according to claim 1, wherein a neutral axis of the sandwich structure, when viewed in the radial cross section along the central axis, deviates from a straight line at a maximum deviation point by a distance of approximately 25% of the total thickness of the sandwich structure measured at the maximum deviation point.

14. The pressure bulkhead according to claim 1, wherein the distance between the outer face sheet and the inner face sheet, when measured at a center of the semiminor axis, is between 50% and 75% of the distance between the outer face sheet and the inner face sheet, when measured at a center of the semimajor axis.

15. The pressure bulkhead according to claim 1, wherein the distance between the outer face sheet and the inner face sheet, when measured at a center of the semiminor axis, is approximately 60% of the distance between the outer face sheet and the inner face sheet, when measured at a center of the semimajor axis.

* * * * *